United States Patent [19]

Baltisberger

[11] 4,028,572

[45] June 7, 1977

[54] STATOR WINDING STRUCTURE FOR DYNAMO-ELECTRIC MACHINE

[75] Inventor: Kurt Baltisberger, Birr, Switzerland

[73] Assignee: BBC Brown Boveri & Company Limited, Baden, Switzerland

[22] Filed: May 7, 1975

[21] Appl. No.: 575,151

[30] Foreign Application Priority Data

May 20, 1974  Switzerland .................. 6855/74

[52] U.S. Cl. ...................... 310/201; 318/224 R
[51] Int. Cl.² .................................. H02K 3/04
[58] Field of Search ............ 310/188, 71, 184, 189, 310/180, 179, 200–208, 260, 213, 64; 318/224, 225

[56] References Cited

UNITED STATES PATENTS

| 1,843,589 | 2/1932 | Apple | 310/201 |
| 2,407,935 | 4/1946 | Perfetti | 310/201 |
| 3,089,048 | 5/1963 | Bahn | 310/260 |
| 3,185,872 | 5/1965 | Weissheimer | 310/213 |
| 3,197,686 | 7/1965 | Rawcliffe | 318/224 |
| 3,408,517 | 10/1968 | Willyoung | 310/202 |
| 3,673,477 | 6/1972 | Broadway | 310/202 |
| 3,794,870 | 2/1974 | Broadway | 310/180 |
| 3,825,783 | 7/1974 | Duffert | 310/213 |
| 3,898,543 | 8/1975 | Broadway | 318/224 |

*Primary Examiner*—R. Skudy

*Attorney, Agent, or Firm*—Pierce, Scheffler & Parker

[57] ABSTRACT

A polyphase stator winding for three or more phase pole-changeable synchronous machines includes rod-type windings which are encased within each other in a multi-layer arrangement in the stator slots. The winding arrangement will permit for any pole-number pairings occurring in practice an additional degree of free-choice in the selection of the number of poles or speeds, respectively that can be paired with each other, and of the winding pitches and spread values which are advantageous in relation to harmonics content, and in relation to the spread factor and consequently the winding factor as well as with respect to losses. The arrangement of the windings is characterized by selecting, for the two windings, winding pitches which differ from one another by an integer and even constant C expressed by the relation $C = w_1 - w_2$ where (in the case of wave type windings) the constant C takes values $\pm 2, \pm 4, \pm 6$ and so forth, where (in the case of lap type windings) the constant C takes the values $-2, 0, \pm 4, \pm 6$ and so forth, wherein $w_1$ and $w_2$ represent the slot pitches, and wherein there is provided for each winding an inter-connecting device including oblique eye-rods for at least one winding designed to bridge the gaps between the rods of the lower layer to be connected and the corresponding rods of the upper layer.

3 Claims, 9 Drawing Figures

STATOR WINDING STRUCTURE FOR DYNAMO-ELECTRIC MACHINE

The present invention relates to an improved stator winding arrangement, to be used especially for three or more polyphase pole-changeable synchronous machines and with conductor rod windings which are encased within each other.

The rod type conductors of a winding of an electric machine are distributed over the stator perimeter and placed in the various slots, and the voltages generated across the individual conductors must be summed up while taking into consideration their phase position (see: Boedefeld & Sequenz "elektrische Maschinen", sixth edition, pages 163 to 169, and R. Oberholzer "Konstruktion elektrischer Maschinen", II. "Synchronmaschinen", pages 18 to 40).

The resulting voltage of a stator winding is smaller than the number which is obtained by the multiplication of the number of conductors with the voltage of a conductor and it is therefore necessary to multiply the algebraic sum of the individual voltages by a factor in order to arrive at the real voltage (geometric sum). The factor $\epsilon$ is called the slot factor and is controlled by the geometric layout of the winding.

In the case of chorded windings, where a shortening or a lengthening of the pitch is accomplished in order to suppress certain harmonics of the voltage curve, and where the two coil sides of the coil are not set apart by more than one pole-pitch $\tau_p$, the slot factor of a winding of one phase will be:

$$\xi = \frac{\sin q\alpha/2}{q \sin \alpha/2} \cdot \sin \frac{w}{\tau p} \frac{\pi}{2}$$

wherein are represented $w$ the coil width, or pitch, by slot pitches
$\tau_p$ the pole-pitch by slot pitches
$q$ the number of slots per pole and phase, and
$\alpha$ the electric angle which corresponds to the mechanical angle formed by two adjacent slots.

The factor $k_p = \sin w\pi/\tau_p 2$ is called the spread factor, and the ratio $s = w/\tau_p$ the chording. In order to eliminate the $\nu$-th harmonic in the voltage curve, it will be necessary to shorten (or lengthen) the winding path $w$ by the $1/\nu$th amount of the pole-pitch $\tau_p$. In many instances there is selected $w/\tau_p = 0.81$ or $w/\tau_p = 1.2$, thus suppressing to a large extent the fifth and the seventh harmonic.

In the case of pole-changeable synchronous machines, employed for pumped storage systems, the chording problem becomes complicated because it is necessary there to pair within one single machine two different numbers of poles and two different speeds with each other. Usually, two separate chorded windings are used for the two different numbers of poles, windings which can either be superposed or encased within each other. The latter type, either in the form of lap or wave windings, were found to be particularly advantageous if high voltages and wattages are involved (see Brown Boveri Mitteilung 6/7, 1970, page 299).

In the case of the known winding arrangements with wave windings encased within each other, used for pole-changeable synchronous machines, the pitch $w_1$ (coil width) of winding 1 is identical with the pitch $w_2$ of the winding 2, or $w_1 = w_2$. Due to this specific relation between pitches $w_1$, $w_2$, only one of the spread values $s_1$, $s_2$ can be selected freely since the other value is fixed by the value chosen and by the pole pitches $\tau_{p_1}$ and $\tau_{p_2}$. The following relations apply: $w_1 = s_1 \tau_{p_1}$; $w_2 = s_2 \tau_{p_2}$; $s_1 \tau_{p_1} = s_2 \tau_{p_2}$; and therefore $s_2 = s_1 \tau_{p_1}/\tau_{p_2}$.

The common pitch $w = w_1 = w_2$ is usually chosen in such manner that it averages the two pitches which are the most desirable for the number of poles involved, taking into consideration the harmonics to be suppressed. In the case of this method, the pitch for one of the windings is usually underchorded, and the pitch for the other winding overchorded, and as a result thereof one of the two windings will often be hampered seriously.

In the case of lap windings, encased within each other, it is the present practice to select, for the two windings, pitches which are differenciated by two slot pitches. The connection of the conductor rods of the lower layer with the rods of the upper layer can then be accomplished in a simple manner by straight standard eye rods. In the case of certain pole-number pairings a lap winding arrangement of this type will result in more appropriate chording values.

In the case of a multitude of speeds, or numbers of poles respectively, which are to be paired in a pole-changeable synchronous machine, the selection of the pitches is very limited in spite of the above discussed possibility, and the specific selection and the use of the known connecting arrangements can lead to very unfavorable values, specifically the chording, the content of harmonics, the spread factor, and thus the slot factor, and also the losses.

The winding arrangements which are used in the present state of the art for pole-changeable synchronous machines are therefore characterized by:

a. lap windings with identical pitches, resulting in the limitation that only those numbers of poles, or speeds respectively, can be paired in a synchronous machine which are in close approximation to each other;

b. wave windings with pitches which are identical or differentiated from each other by two slot pitches;

c. free selection of the spread value of only one of the windings;

d. the fact that after selection of the spread value for one of the windings the other winding will have a fixed, and often disadvantageous spread value;

e. frequent underchording of one winding and a corresponding overchording of the other winding;

f. undesirable harmonics in one and/or the other winding;

g. unfavorable values of the spread factor, the winding factor and the losses; and h. standard connecting arrangements by means of straight eye rods.

A primary objective of the invention is to avoid the disadvantages of the presently known arrangements, and to create a stator winding arrangement with two separate windings encased within each other, which will be suitable for three- or more phase pole-changeable synchronous machines, which will allow for any pole-number pairings occurring in practice an additional degree of free choice in the selection of the number of poles, or speeds respectively, that can be paired with each other, and of the winding pitches and the spread values, which will provide advantageous values for the content of harmonics, the spread factor and consequently the winding factor as well as for the losses, these values to be applicable to both windings, an arrangement which is finally distinguished by a novel connecting device for each winding, bridging the conductor rods placed apart from each other and requiring interconnection.

This problem is solved with the aid of a stator winding arrangement of the above discussed type in that the pitches of the two windings will differ by an integer and even constant C, express by the relation:

$$C = w_1 - w_2,$$

where, in the case of wave windings, the constant C takes the values $\pm 2$, $\pm 4$, $\pm 6$ and so forth, where in the case of lap windings, the constant C takes the values $-2$, $0$, $\pm 4$, $\pm 6$ and so forth, where $w_1$, $w_2$ represent the pitches of windings 1 and 2, with $w_1$, $w_2$ and C expressed in slot pitches, and that there is provided for each winding an inter-connecting device designed to bridge the gaps between the rods of the lower layer to be connected and the corresponding rods of the upper layer, possessing oblique eye rods at least for one winding.

Practical embodiments of the invention will now be described in conjunction with the accompanying drawings wherein.

Figure 1:
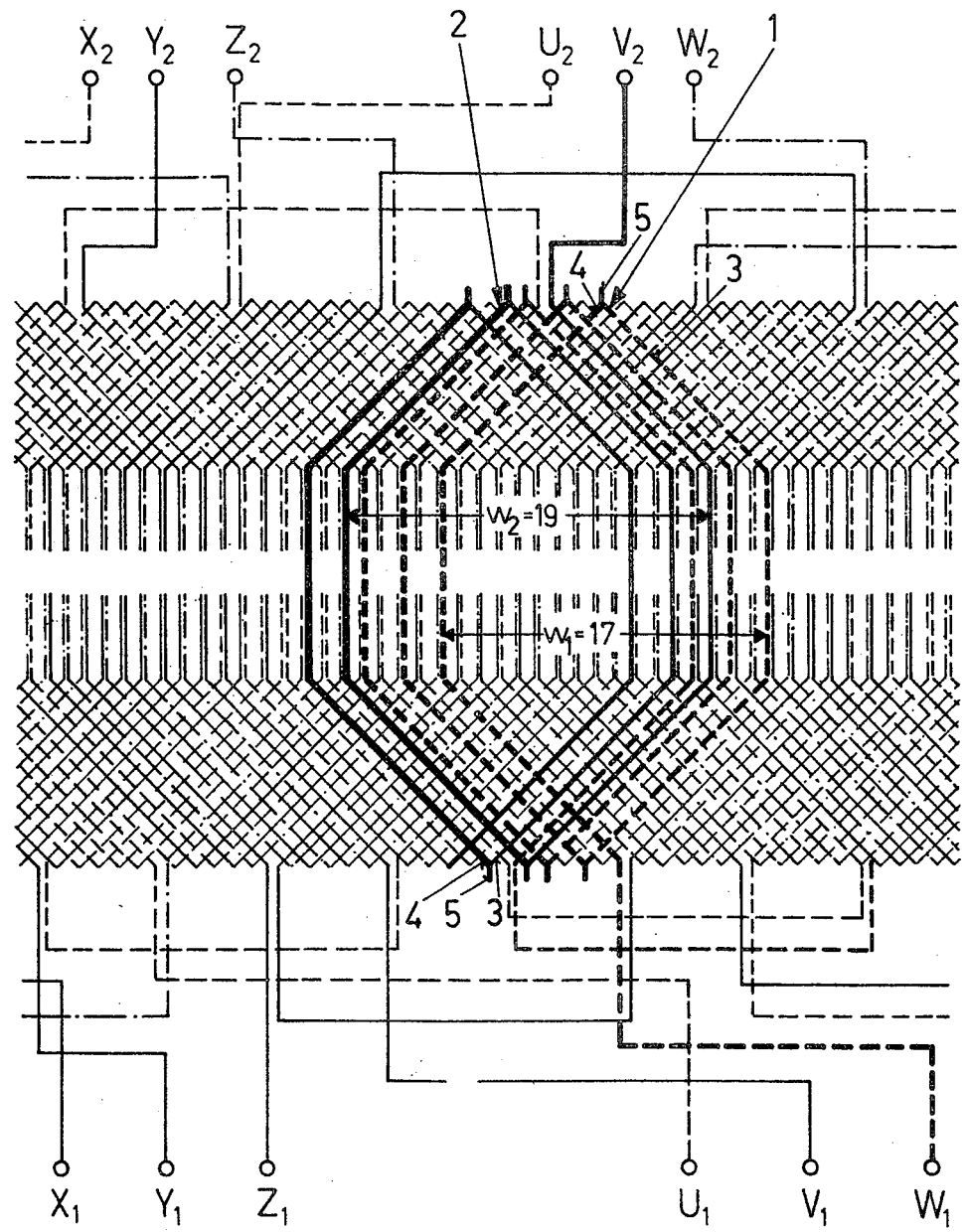
FIG. 1 illustrates an arrangement of a lap winding, representing known practice where the pitch of the first winding differs from the pitch of the second winding by two slot pitches.
Figure 2:
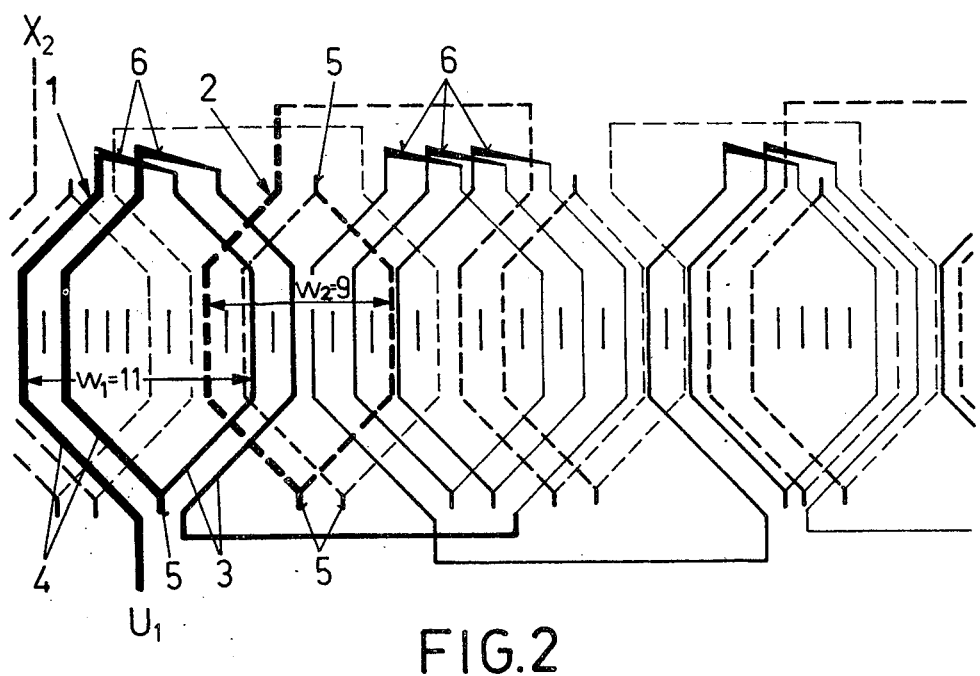
FIG. 2 shows one example of a lap winding arrangement in accordance with the invention where the pitch of the first winding differs from the pitch of the second winding by two slot pitches.
Figure 3:
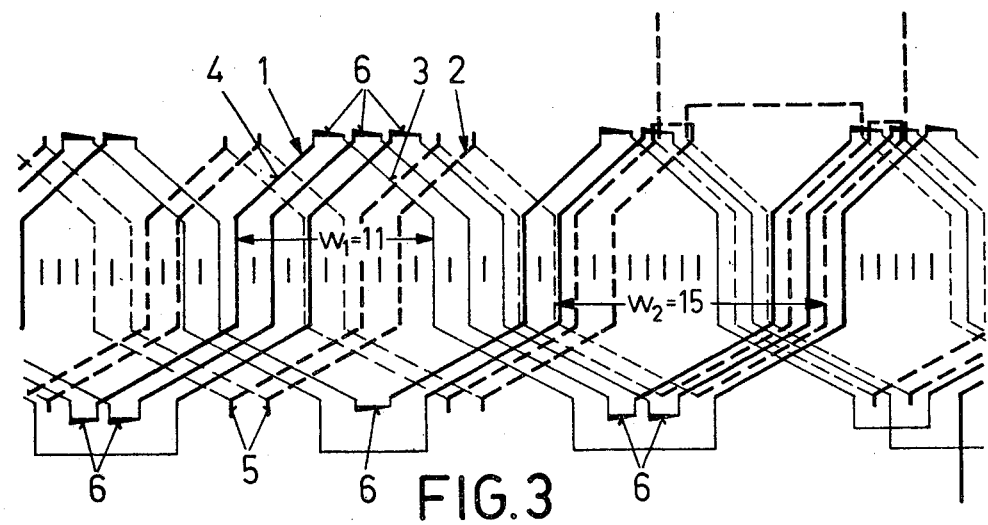
FIG. 3 shows one example of a wave winding arrangement in accordance with the invention where the pitch of the first winding differs from the pitch of the second winding by two slot pitches.
Figure 4:
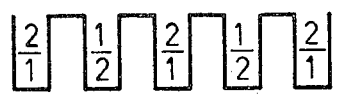
Figure 5:
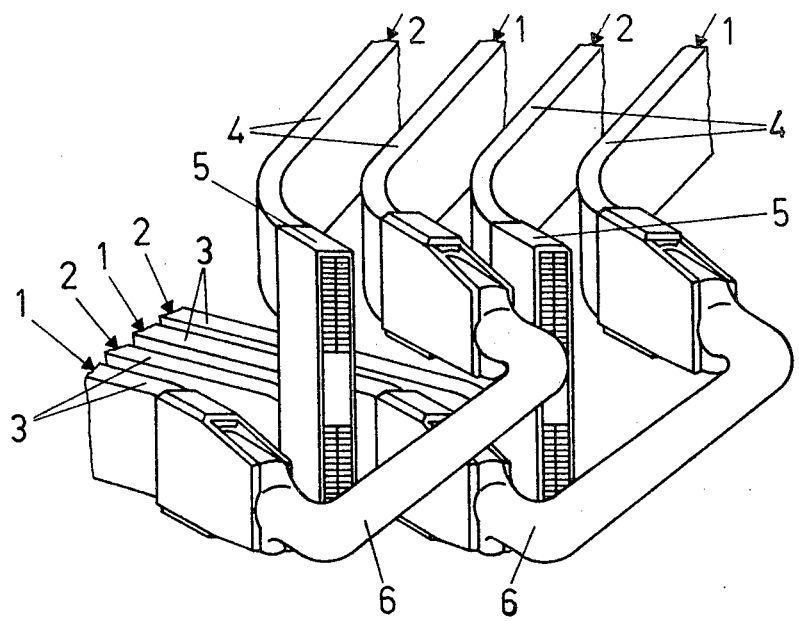
Figure 7:
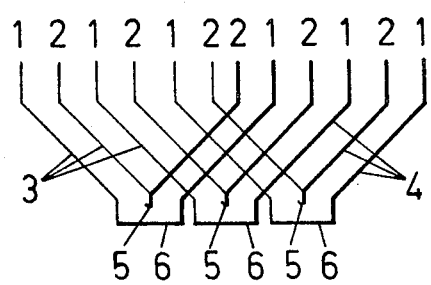
Figure 6:
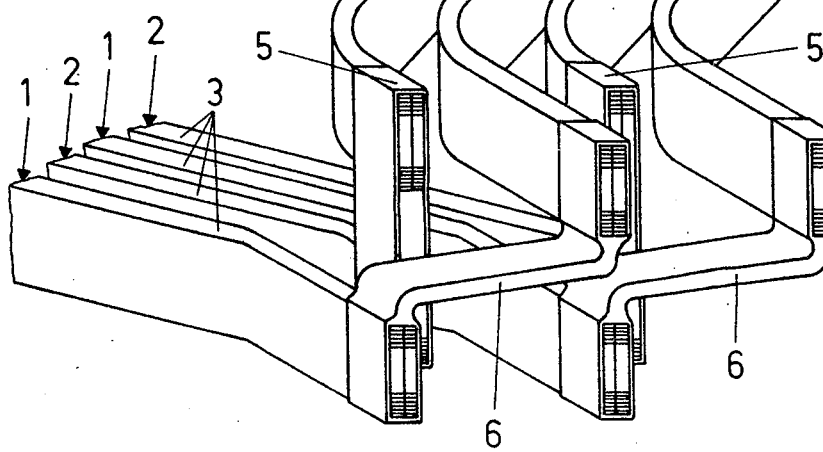
Figure 8:
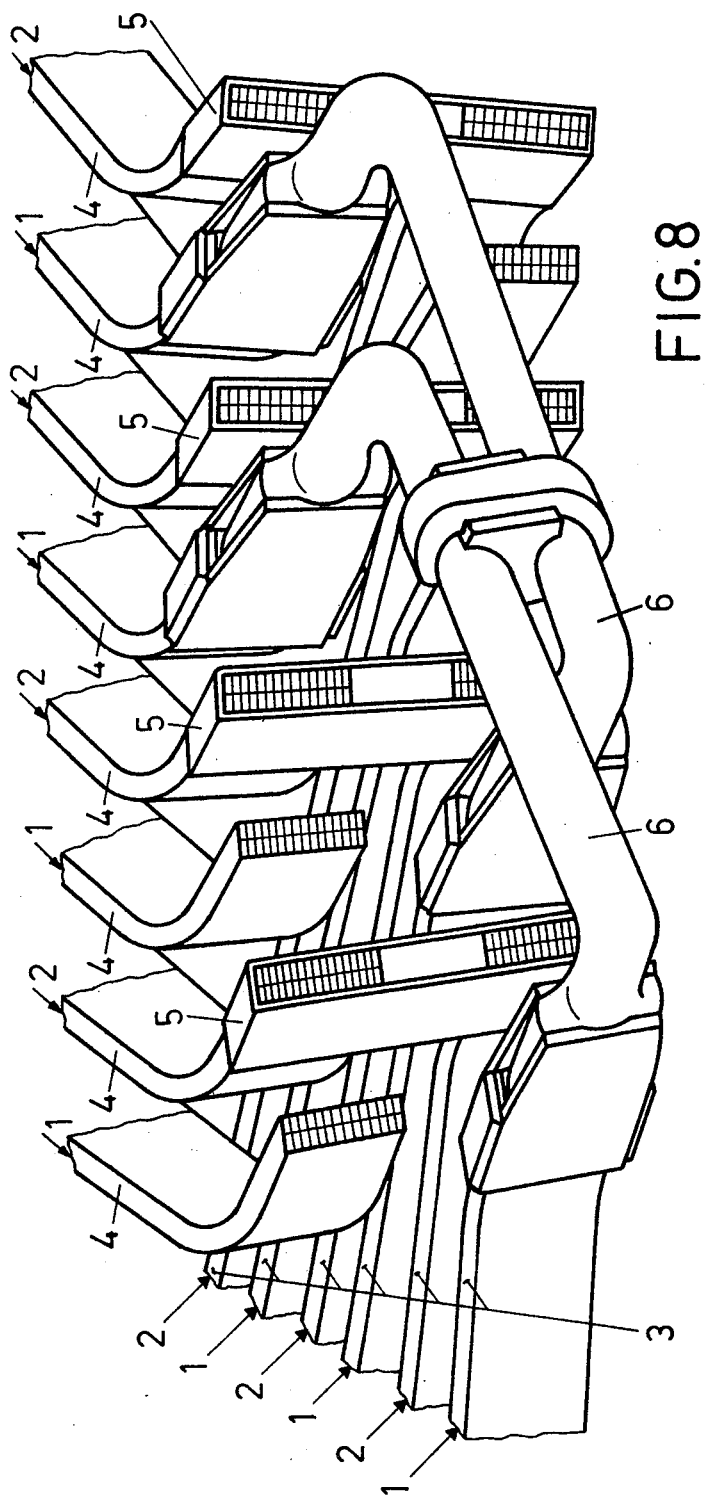
Figure 9:
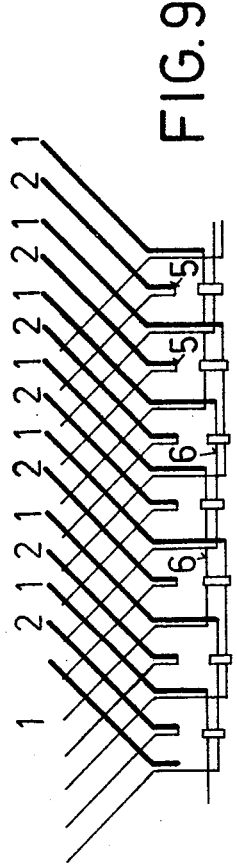

FIG. 4 illustrates the positioning of the windings 1 and 2 in the slots in the case of the winding arrangements shown by FIGS. 1, 2 and 3;

FIG. 5 shows a connecting system with oblique eye rods, manufactured from round bars, used for a winding arrangement with two windings, their pitches differing by two slot pitches;

FIG. 6 shows an arrangement which is similar to the arrangement depicted by FIG. 5 where the oblique eye rods are made from flat rods;

FIG. 7 shows the arrangements of FIGS. 5 and 6 in diagrammatic form;

FIG. 8 illustrates an arrangement similar to FIG. 5, where the pitches of the two windings differ by four slot pitches; and FIG. 9 shows the arrangement of FIG. 8 in diagrammatic form.

In the explanations given below, the index 1 refers to winding 1 and the index 2 to the winding 2. The symbols denote:

W the first approximate value of the winding pitch, in slot pitches
w the winding pitch in slot pitches
p the number of pole pairs
n the speed in rpm's
$\tau_p$ the pole-pitch in slot pitches
S the desired chording
s the actual chording
Q the number of slots
q the number of slots per pole and phase, and f the frequency of the generated alternating voltage. The following relations apply:

$$\tau p_1 = \frac{Q}{2p_1} \; ; \; \tau p_2 = \frac{Q}{2p_2} \; ; \; p_1 = \frac{60f}{n_1} \; ; \; p_2 = \frac{60f}{n_2}$$

$$w_1 = s_1 \tau p_1 = \frac{Q}{2} \frac{s_1}{p_1} \quad w_2 = s_2 \tau p_2 = \frac{Q}{2} \frac{s_2}{p_2}$$

$$w_1 - w_2 = \frac{Q}{2}\left(\frac{s_1}{p_1} - \frac{s_2}{p_2}\right) = \frac{Q}{120f}(s_1 n_1 - s_2 n_2)$$

In order to arrive at the calculated most desired spread values $S_1$, $S_2$ for the spread values $s_1$, $s_2$, the last relation above becomes:

$$w_1 - w_2 = \frac{Q}{2}\left(\frac{S_1}{p_1} - \frac{S_2}{p_2}\right) = \frac{Q}{120f}(S_1 n_1 - S_2 n_2).$$

this relation demonstrates that the selection of identical pitches, $w_1 = w_2$, as is done in the case of the wave winding arrangements representing the present state of the art, is justified only, so far as most desirable chording of the two windings is concerned, if $$\frac{S_1}{p_1} = \frac{S_2}{p_2},$$

in other words if $$\frac{p_2}{p_1} = \frac{S_2}{S_1},$$

or respectively if $S_1 n_1 = S_2 n_2$, in other words if $$\frac{n_1}{n_2} = \frac{S_2}{S_1},$$

because only in this case will $w_1 - w_2$ become zero.

If these conditions are not met, as will be true in most cases, $w_1 - w_2$ will not be zero any longer but will have a value which can be computed, with the values for $p_1$, $p_2$, $S_1$, $S_2$ and $Q$ given, by means of the relation $$C = w_1 - w_2 = \frac{Q}{2}\left(\frac{S_1}{p_1} - \frac{S_2}{p_2}\right),$$

a value which, in many cases, can be of substantial magnitude. It is for this reason that wave windings, arranged in accordance with the present state of the art, are suitable only for the pairing of numbers of poles, or speeds respectively, if these values are in close proximity to each other (for example 18/20; 22/24 etc.).

According to the invention, the constant C will take the values $\pm 2$, $\pm 4$, $\pm 6$ and so forth in the case of winding arrangements with two wave windings, where the values $s_1$ and $s_2$ represent spread values which will differ only slightly from the calculated most desired spread values $S_1$ and $S_2$ which are determined by taking into consideration the harmonics which are to be suppressed.

The selection of winding pitches, differing from each other by two slot pitches, for the winding arrangements with two lap windings, which represents the present state of the art, is again very restrictive so far as the design of such winding arrangements is concerned, and results in unfavorable spread values in the case of a majority of pole numbers paired in a pole-changeable synchronous machine. According to the invention, the constant C can take, in the case of lap windings, not only the value +2 but also the values 0, −2, ±4, ±6 etc., and the spread values $s_1$ and $s_2$ will again differ only slightly from the calculated most desired spread values $S_1$ and $S_2$, which are determined by taking into consideration with harmonics which are to be suppressed.

In the drawings identical components are denoted by identical reference numerals.

The windings arrangement of FIG. 1 shows two lap windings 1 and 2, encased within each other and designed in accordance with the present state of the art. The data relating to the two windings are as follows:

| Winding 1 | Winding 2 |
|---|---|
| Q = 288 | Q = 288 |
| $2p_1$ = 16 | $2p_2$ = 12 |
| $n_1$ = 375 | $n_2$ = 500 |
| $w_1$ = 17 | $w_2$ = 19 |
| $\tau p_1 = \dfrac{Q}{2p_1} = 18$ | $\tau p_2 = \dfrac{Q}{2p_2} = 24$ |
| $s_1 = \dfrac{w_1}{\tau p_1} = .94$ | $s_2 = \dfrac{w_2}{\tau p_2} = .79$ |

The pitches $w_1$, $w_2$ of the windings differ by two slot pitches, namely $$w_2 - w_1 = 19 - 17 = 2.$$

In the case of this arrangement, the ends of the rods 3 of the lower layer are located directly below the ends of rods 4 of the upper layer, the ends to which they must be connected, and it is therefore possible to accomplish this connection in a simple manner by means of the straight standard eye rods 5, illustrated schematically. However, of the two spread values $s_1 = 0.94$ and $s_2 = 0.79$, only $s_1$ comes close to the most desirable spread value $S = 0.81$ which is advantageous when taking the harmonics content into consideration. Therefore, winding 1, with $s_1 = 0.94$, is unfavorably chorded, while the winding 2, with $s_2 = 0.79$, possesses a spread value nearly equal to the most desirable spread value.

FIG. 2 shows one species of a windings arrangement proposed by the invention, with two lap windings 1 and 2 which are encased within each other. The data relating to the two windings are as follows:

| Winding 1 | Winding 2 |
|---|---|
| Q = 120 | Q = 120 |
| $2p_1$ = 8 | $2p_2$ = 10 |
| $n_1$ = 750 | $n_2$ = 600 |
| $w_1$ = 11 | $w_2$ = 9 |
| $\tau p_1 = \dfrac{Q}{2p_1} = 15$ | $\tau p_2 = \dfrac{Q}{2p_2} = 12$ |
| $s_1 = \dfrac{w_1}{\tau p_1} = .73$ | $s_2 = \dfrac{w_2}{\tau p_2} = .75$ |

The pitches $w_1$, $w_2$ of the windings 1 and 2 again differ by two slot pitches, namely $w_1 - w_2 = 11 - 9 = 2$. The rods 3 of the lower layer are connected to the rods 4 of the upper layer of the winding 1 on one side by means of the oblique eye rods 6, while at the other side there are provided straight eye rods 5. The winding 2 has only straight eye rods 5. The spread values $s_1 = 0.73$ and $s_2 = 0.75$ differ only slightly from the most desirable value $S = 0.81$, advantageous in view of the harmonics content.

FIG. 3 shows a species of a winding arrangement proposed by the invention with two wave windings 1 and 2 which are encased within each other. The data relating to the two windings are as follows:

| Winding 1 | Winding 2 |
|---|---|
| Q = 120 | Q = 120 |
| $2p_1$ = 8 | $2p_2$ = 10 |
| $n_1$ = 750 | $n_2$ = 600 |
| $w_1$ = 11 | $w_2$ = 15 |
| $\tau p_1 = \dfrac{Q}{2p_1} = 15$ | $p_2 = \dfrac{Q}{2p_2} = 12$ |
| $s_1 = \dfrac{w_1}{\tau p_1} = .73$ | $s_2 = \dfrac{w_2}{\tau p_2} = 1.25$ |

The pitches $w_1$, $w_2$ of the windings 1 and 2 differ by four slot pitches, namely $$w_1 - w_2 = 15 - 11 = 4.$$

The rods 3 of the lower layer are connected with the rods 4 of the upper layer of the winding 1 at both sides by means of oblique eye rods 6. The winding 2 has straight eye rods 5 only. Here again the spread values $s_1 = 0.73$ and $s_2 = 1.25$ differ only slightly from the most desirable values 0.8 and 1.2, advantageous in view of the harmonics content.

FIG. 4 shows the arrangement of the conductor rods of the windings, illustrated in FIGS. 1, 2 and 3, within the slots of the stator bore. Within each slot there are arranged in superposed position two conductor rods, one rod each from each winding. These rods form two layers, one upper and one lower layer, with adjacent rods of one layer being parts of different winding.

The connection of the rods of the lower layer with the corresponding rods of the upper layer of a winding pose a special problem in the case of the arrangements of windings as proposed by the invention because the rods to be connected could be located under certain circumstances at considerable distances from each other, and because obstacles within these spaces must be by-passed.

FIGS. 5, 6 and 8 show various species of the connecting arrangements proposed by the invention, with the species illustrated by FIGS. 5 and 6 and shown schematically by FIG. 7, designed for a windings arrangement where the pitches of windings 1 and 2 differ by two slot pitches, while the species illustrated by FIG. 8 and shown schematically by FIG. 9 is designed for a windings arrangement where the pitches of windings 1 and 2 differ by four slot pitches. The connecting arrangement according to the invention is characterized by the fact that one or both windings are provided with oblique eye rods. The oblique eye rods of one winding can be identical with, or different from each other. Furthermore, both windings may contain some straight eye rods.

In the case of the connecting system shown by FIG. 5 the ends of the upper rods 4 of the winding 2 are arranged directly above the ends of the lower rods 3 of the winding 2. Also, the axial projections of the rods involved are identical, thus making it feasible to connect these rods by means of straight standard eye rods 5. However, the end portions of rods 3 and 4 of winding 1, to be connected with each other, are located in different planes, but these planes are arranged parallel relative to each other. The axial projections of the rods involved are identical with each other as well as with the axial projections of the rods of winding 2. In order to by-pass the straight eye rods 5, there are used the U-shaped oblique eye rods 6 to connect the matching rods 3 and 4 of the winding 1. These oblique eye rods 6 are manufactured from round rods and this specific connection is called a round bar connection.

The connection system illustrated by FIG. 6 differs from the system shown by FIG. 5 only by the fact that the rods of the winding 1 have axial projections that are longer than the projections of the rods of winding 2 so that the most suitable shape for the oblique eye rods 6 will be a ⌐-shape. In this case the oblique eye rods 6 are manufactured from flat rods, and this specific connection is called a flat bar connection.

The connecting system illustrated by FIGS. 8 and 9 is substantially identical with the system shown by FIG. 5, the only difference being that it is used for a windings arrangement where the pitches of the two windings 1, 2 differ by four slot pitches, as explained above.

The round rods of this system can be provided with bores, if necessary for the purpose of liquid cooling.

For the purpose of practical application there are established two calculated most desired spread values $S_1$ and $S_2$, determined by taking into consideration the harmonics to be suppressed. A first approximate value $C_1$ of the constant C is determined from the relation $$C_1 = \frac{Q}{2}\left(\frac{S_1}{p_1} - \frac{S_2}{p_2}\right).$$

As the value for C there is selected the integer and even constant which comes close to $W_1$. The first approximate values $W_1$, $W_2$ of the pitches $w_1$, $w_2$ are then determined with the aid of the relations $W_1 = S_1 \tau_{p_1}$ and $W_2 = S_2 \tau_{p_2}$. For the pitches $W_1$, $w_2$ there are then selected integer odd values which come closest to the values $W_1$ and $W_2$ and which differ by the constant C. The final spread values $s_1$, $s_2$ are then determined from the relations $s_1 = w_1/\tau_{p_1}$ and $s_2 = w_2/\tau_{p_2}$.

It should be noted that there exist several choices when selecting the values $S_1$, $S_2$. For example, it is possible to select $S_1 = S_2 = 0.8$ or $S_1 = 0.8$ and $S_2 = 1.2$ or $S_1 = S_2 = 1.2$. The pitch values resulting from these spread values, which are equivalent so far as the content of harmonics is concerned, differ from each other and can readily be taken into consideration when the final pitches are to be selected so that the spread values $s_1$, $s_2$ will come sufficiently close to the desired values $S_1$, $S_2$.

Therefore, the windings arrangements proposed by the invention for use in synchronous machines provided with a polechanging switch are distinguished by the following features:

a. wave windings with unequal pitches, where the pitches of the windings differ by ±2, ±4, ±6 and so forth, and thus make it feasible to pair two pole number, or speeds respectively, of a synchronous machine which are further apart from each other than in machines representing the present state of the art where such feature is not possible;

b. lap windings with even or odd pitches, where the pitches of the windings differ by −2, 0, ±4, ±6 and so forth;

c. substantially free choice in the selection of the spread values for the two windings;

d. suppression of undesirable harmonics in both windings;

e. advantageous values for the spread factor, the pitch factor and the losses; and f. a novel connecting system to connect the rods of the upper layer with the rods of the lower layer of the windings concerned, where oblique eye rods are provided for at least one winding.

I claim:

1. A stator winding arrangement for a polyphase synchronous electrical machine of the pole-changeable type comprising first and second windings encased within each other and distributed in alternation in upper and lower layers in the stator slots, the respective pitches of said windings differing by an even number of slots, each said winding being composed of rigid conductor rods and including axially projecting ends to be interconnected, at least some of the ends of the rods of said first winding in a lower layer being connected to the ends of the rods of that winding in an upper layer by means of straight eye rods and at least some of the ends of the rods of said second winding in a lower layer being connected to the ends of the rods of that winding in an upper layer by means of oblique eye rods located axially outward from and which extend around said straight eye rods.

2. A stator winding arrangement for an electrical machine as defined in claim 1 wherein the ends of said conductor rods of both windings have identical axial projections and said oblique eye rods have a U-shape.

3. A stator winding arrangement for an electrical machine as defined in claim 1 wherein the axially projecting ends of said conductor rods of said first winding are shorter than the axially projecting ends of said conductor rods of said second winding and each of said oblique eye rods have a central portion and two end portions extending in opposite directions therefrom.

* * * * *